(12) United States Patent
Podda et al.

(10) Patent No.: US 12,127,644 B2
(45) Date of Patent: Oct. 29, 2024

(54) MEMBER FOR HOLDING AN OBJECT IN POSITION ON EITHER SIDE OF AN ELEMENT PROVIDED WITH A BORE

(71) Applicant: Florent Podda, Cannes la Bocca (FR)

(72) Inventors: Florent Podda, Cannes la Bocca (FR); Sébastien Podda, Cannes la Bocca (FR)

(73) Assignee: FP SYSTEME, Cannes la Bocca (FR)

( * ) Notice: Subject to any disclaimer, the term of this patent is extended or adjusted under 35 U.S.C. 154(b) by 93 days.

(21) Appl. No.: 17/787,685

(22) PCT Filed: Dec. 8, 2020

(86) PCT No.: PCT/IB2020/061622
§ 371 (c)(1),
(2) Date: Jun. 21, 2022

(87) PCT Pub. No.: WO2021/124009
PCT Pub. Date: Jun. 24, 2021

(65) Prior Publication Data
US 2023/0017041 A1    Jan. 19, 2023

(30) Foreign Application Priority Data
Dec. 20, 2019  (FR) ...................................... 1915362

(51) Int. Cl.
*A44C 7/00*      (2006.01)
*A01K 11/00*    (2006.01)

(52) U.S. Cl.
CPC ............ *A44C 7/003* (2013.01); *A01K 11/001* (2013.01)

(58) Field of Classification Search
CPC ....... A44C 7/003; A44C 7/006; A01K 11/001; Y10T 24/41
See application file for complete search history.

(56) References Cited

U.S. PATENT DOCUMENTS

| 292,810 A | * | 2/1884 | Hartman | A44C 7/00 63/12 |
| 396,788 A | * | 1/1889 | Washburn | A44C 7/003 D11/75 |

FOREIGN PATENT DOCUMENTS

DE                    373805 C   *   1/2013   ........... A01K 11/001

* cited by examiner

*Primary Examiner* — Jack W Lavinder

(57) ABSTRACT

A holding member secures an object in position relative to an element having a bore. The object has a male part designed as a pointed rod, the free end of which is suitable for inserting in a reception housing provided in a female part of the holding member. The reception housing is provided, at its opening, with a conical member for guiding the male part into the reception housing. The holding member also includes a ring and seals inserted between the cylinder and a main body of the holding member.

7 Claims, 3 Drawing Sheets

MEMBER FOR HOLDING AN OBJECT IN POSITION ON EITHER SIDE OF AN ELEMENT PROVIDED WITH A BORE

CROSS-REFERENCE TO RELATED APPLICATIONS

The present application is a national stage entry under 35 U.S.C. § 371 of international application no. PCT/IB2020/061622, filed on Dec. 8, 2020, which claims priority to French patent application no. 1915362, files on Dec. 20, 2019, the entire contents of which are incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION BY REFERENCE

Not applicable.

STATEMENT REGARDING PRIOR DISCLOSURES BY THE INVENTOR OR A JOINT INVENTOR

Not applicable.

BACKGROUND OF THE INVENTION

The present invention relates to a member for holding an object in position on an element provided with a bore.

Here, the term "element" may be a part of the body of a living being provided with a bore. Here, the expression "living being" concerns a human as well as a mammal or bird, whether a domestic or wild animal. The part of the body of a living being considered by the invention may be an ear, a cheek, a nostril or a wing in the case of a bird. The object may be a decorative accessory or a means for identifying and/or locating the living being. By way of non-limiting examples, mention may be made of earrings, piercings, jewelry, animal identification tags, GPS beacons, etc.

The element provided with a bore, according to the invention, may be a piece of fabric or a part of a garment. Thus, the object is, for example, a pin, a brooch, or a cufflink. In the context of the invention, the object is held on either side of the element, part of the body or fabric or garment, by passing a portion of the object through the element, said element being advantageously perforated beforehand.

The invention is applicable regardless of the constituent material of the holding member, the object, or the element. Thus, it may be made of metal, precious or not, metal alloys, wood, stone, ceramic, composite materials or polymers, or a combination of several of these materials.

One of the solutions for maintaining such an object consists in having the object be in two parts: a so-called male part passes through an orifice made in the part of the bored element concerned, passing from one side of this part of the element and being inserted into a housing formed in another so-called female part, positioned on the other side of the part of the element, facing said orifice. Commonly, the male part is configured as a rod and it is held in position in the female part by wedging. Said retention is advantageously reversible in order to be able, if necessary, to separate the two parts of the object and therefore to remove it from the element concerned.

Said mode of retention is effective and suitable both for the retention of a decorative accessory such as a piece of jewelry, a cufflink, or an earring as well as an animal identification member of the earring type or wing ring type. Nevertheless the insertion of the male part in the housing is not easy because, if the installation is carried out by the person receiving said object and in this case said person is unable to see the two parts simultaneously, it involves positioning the male and female parts blindly, by trial and error. When it comes to positioning the object on an animal, said animal is generally not anesthetized, so the positioning operation must be carried out quickly, and the insertion of the male part into the housing must be carried out on the first try.

A known solution from WO-A-2006 086 311 consists in using magnetized parts instead of male and female parts. Such a solution is actually faster for ensuring the positioning but, in addition to the pinching effect on the pierced element, which in the case of an anatomical part may be painful, a magnetic connection with an element interposed between the magnets is not strong enough to prevent accidental detachment of the two magnetized parts. WO-A-92/21262 discloses a device limiting any allergic reaction at the piercing of the ear. For this, the earring attachment rod is passed through a tube of non-allergenic material that is inserted into the hole of the earlobe and isolates the metal of the earring post from the skin. The tube is held in position by a threaded nut pressed against the back of the earlobe. The tube comprises an open funnel-shaped end for inserting the rod of the earring, said earring having to pass through the nut for its retention. This device requires, firstly, for the tube to be positioned and screwed onto the nut and then for the rod to be inserted in the tube and said tube fixed on the nut. In addition to the number of parts involved, the installation is complex and difficult.

There is therefore a need for a secure retention and positioning of an object on either side of a bore that requires a minimum number of parts and is easy to use, even without directly viewing the element and the bore. It is this need that the invention proposes to remedy by proposing a member for holding an object in position on an element provided with a bore which is easy and quick to put in place, whether by the person receiving the object or by a third party and with optimal and lasting support of the object on the element, whatever the nature of said element.

SUMMARY OF THE INVENTION

To this end, the subject of the invention is a member for holding an object in position on an element provided with a bore, said object comprising a so-called male part configured as a pointed rod, the free end of which is adapted to insert into a reception housing formed in a so-called female part of the holding member, characterized in that the reception housing is provided, at its opening, with a means for guiding the male part into the reception housing and in that the guiding means is formed of two parts of similar shape and fitted coaxially one inside the other.

The invention thus makes it possible, with a guiding means, to position the male part precisely and quickly in the reception housing. The person ensuring the placement of the member, whatever it is, does not have to grope to find the housing to introduce the male part into said housing.

According to advantageous but optional aspects of the invention, such a member may comprise one or more of the following features:

The guiding means is configured as a cone of revolution.

The guiding means is configured as a pyramidal-type cone.

A cylinder extends a conical part, the cylinder and the conical part constituting the inner part of the guiding means.

A ring and seals are inserted between the cylinder and a main body of the holding member.

The ring and seals define the reception housing.

The body is provided with at least two gripping members.

The inner wall of the guiding means is smooth or coated with an anti-adherent.

The male part of the holding member is configured as a rod secured to an object and the female part of the member is mounted on part of an element pivotally connected to a lug fixed to said object.

BRIEF DESCRIPTION OF THE SEVERAL VIEWS OF THE DRAWINGS

The invention will be better understood, and further advantages thereof will become more clearly apparent, from reading the following description, which is provided solely by way of a non-limiting example and refers to the accompanying drawings, wherein.

DETAILED DESCRIPTION OF THE INVENTION

Figure 1:
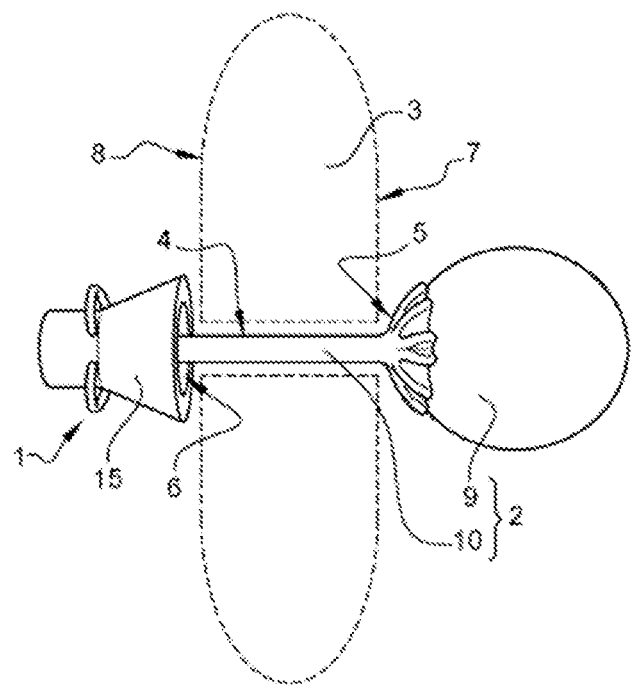
FIG. 1 illustrates a perspective view of the two parts of a holding member according to one embodiment of the invention, in the mounted position on either side of an element, schematically represented by a dotted oval.

FIG. 1 is a representation, according to one embodiment of the invention, of a member 1 for holding an object 2 in position on either side of an element 3 provided with a bore 4. Here, the element 3 is schematically illustrated in the form of a dotted oval. Said oval illustrates a part of a garment, a fabric or a part of the body of a living being, human or animal. In all cases, the element 3 is provided with a through bore 4, the outlets 5, 6 of which open on two opposite faces 7, 8 respectively of the element 3. Here, the outlets 5, 6 are identical. In a variant embodiment, they are different. The object 2 which is held on either side of the element 3 is for example a jewel of the earring type, while the element 3 is an earlobe. For ease of reading, the jewel 2 is represented as a sphere 9 positioned at one end of a rod 10. It is understood that the invention applies to other types of elements 3 and/or objects 2. By way of non-limiting examples, for a human being, mention may be made of a piercing in a cheek, a nostril, or any other part of the body of a human being. For an animal the object may be an identification tag or a wing ring. When the element 3 is not part of a living being, it may be a piece of clothing or a fabric, the object to be held then being, for example, a cufflink, a brooch, or a pin.

As is particularly apparent from FIG. 1, the rod 10 forms a so-called male part of the object 2. The length of the rod 10 is in any case greater than the length of the bore 4, whether or not the rod 10 is straight, has a circular cross section, is notched, smooth, or provided with a screw thread. The free end, not shown, of the rod 10 is pointed and configured to fit into a so-called female part and to form a reception housing 11 provided in the holding member 1. This reception housing 11 is visible in FIGS. 3 and 4.

Figure 2:
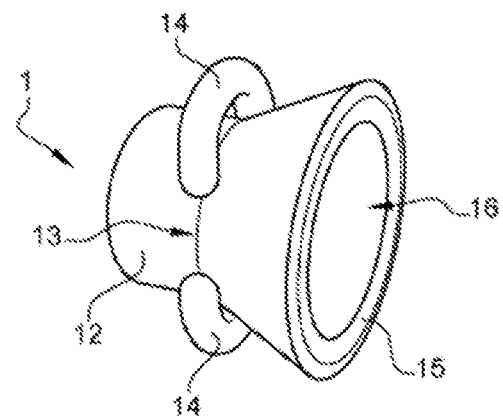
FIG. 2 is a perspective view from a side face, on a larger scale, of the female part of the holding member of FIG. 1 equipped, at the opening of the housing, with a guiding means.

FIG. 2 illustrates the holding member 1, according to one embodiment of the invention. It comprises a main body 12, configured as a cylinder, which is open at the ends and has a circular base. The main body 12 defines a so-called female part of the holding member 1. It houses the reception housing 11 of the rod 10. An open end 13 of the main body 12 is provided with gripping members 14 of the holding member 1. Here, the gripping members 14 are two handles, which are coplanar with the cross section of the body 12. Alternatively, these are lugs, discontinuous reliefs such as spikes, or continuous reliefs in the form of a collar or other geometric shapes. In addition, their number and/or their distribution may be different, provided that these gripping members ensure easy gripping of the holding member 1.

The end 13 forms the access opening to the reception housing 11 of the main body 12. The end 13 is provided with a means 15 for guiding the rod 10 into the reception housing 11 made in the main body 12 of the holding member 1. The guiding means is, in this embodiment of the invention, configured as a cone of revolution, truncated, and with an open circular base. Alternatively, the cone of revolution has an elliptical base. In another embodiment, the cone is of the pyramidal type and thus with a square, rectangular, or polygonal base. In any case, the guiding means 15 has a variable cross section, which is decreasing between its largest opening 16 and its open end 17, which opens into the main body 12, in extension of the end 13 of said main body. Here, the end 17 is also circular. Alternatively, it has another shape, for example different from that of the opening 16. In other words, the guiding means is generally funnel-shaped.

Figure 3:
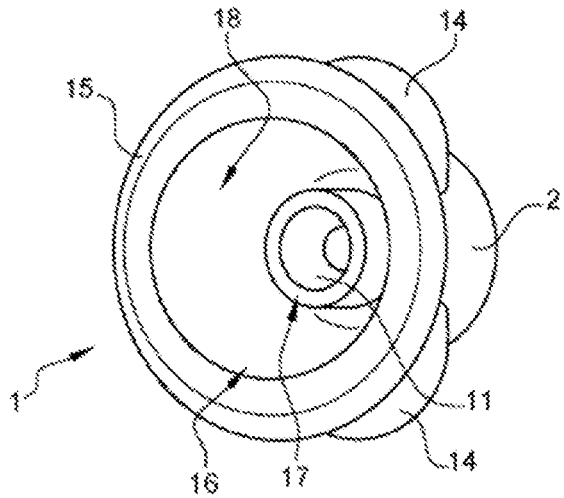
FIG. 3 is a perspective view from the front face and on another scale of the member of FIG. 2.
Figure 4:
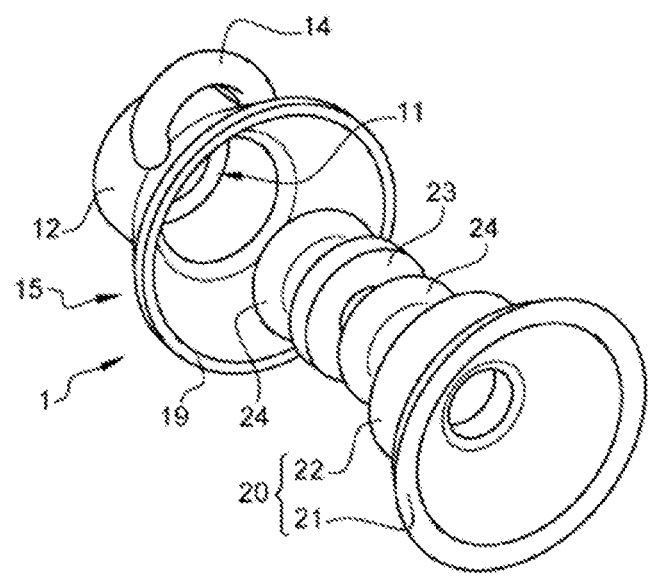
FIG. 4 is a perspective view, from the front face and on another scale, of the various constituent elements of the female part illustrated in FIGS. 2 and 3

As shown in FIGS. 2 to 4, the inner wall 18 of the guiding means is smooth between the opening 16 and the end 17. Alternatively, the wall 18 is coated with an anti-adherent material. The shape of the guiding means 17 and the fact that its inner wall 18 provides no roughness allow optimum guidance of the rod 10 when the latter is introduced into the guiding means 15.

As shown in FIG. 4, the guiding means 15 is advantageously in this embodiment formed by two parts fitted coaxially one inside the other. The outer part 19 has the larger dimensions. It is conical and fixed to the main body 12 in extension of the end 13 of the main body 12.

The other part 20 forms the inner part of the guiding means 15. The part 20 comprises a conical zone 21 with a circular base, with dimensions and shapes complementary to those of the part 19. This zone 21 is fixed on a cylinder 22 with a circular base. The cylinder 22 has dimensions and a shape adapted to be inserted, with minimal play, into the body 12.

A cylindrical ring 23 with a circular base, shown in FIG. 4, is inserted between the cylinder 22 and the body 12. O-rings 24, arranged on either side of the ring 23 ensure that said ring is held in position in the body 12. Thus, the ring 23, the cylinder 22, and the seals 24 define the receiving housing 11 of the rod 10. In this way, the rod 10 is removably held in position by wedging, the dimensions of the openings of the ring 23 and of the seals 24 being slightly smaller than the external diameter of the rod 10. Alternatively, at least one of the seals 24 may be provided with a thread, so that locking the rod 10 in position in its reception housing 11 is carried out by a rotational movement, for example a quarter turn.

When a user introduces the rod 10 via one face 7 or 8 of an element 3, opposite the bore 4, his other hand introduces, via the other face 8 or 7 of the element 3, the guiding means 15. For this, he holds said guiding means by the gripping members 14 and positions it so that the opening 16 of the guiding means 15 is on the bore. It is not necessary for the opening 16 to be centered on the bore; it is sufficient for said bore to be opposite any point located in the plane of the opening 16. Once the positioning has been carried out, the user moves the rod 10 in the direction of the holding member 1. Due to the conical shape of the part 20 and the fact that the wall 18 is smooth, the tip of the rod 10, when it touches the wall 18, is automatically directed, without any slowing down or braking effect, towards the bottom of the cone 20, and therefore towards the ring 23 and the seals 24. The rod 10 is then automatically introduced into its reception housing. It should be noted that, during this movement, it is not necessary for the user or a third party to have a view of the moving elements, as the introduction and retention of the rod 10, and thus of the male part, in the reception housing 11 are carried out quickly and automatically.

Figure 5:
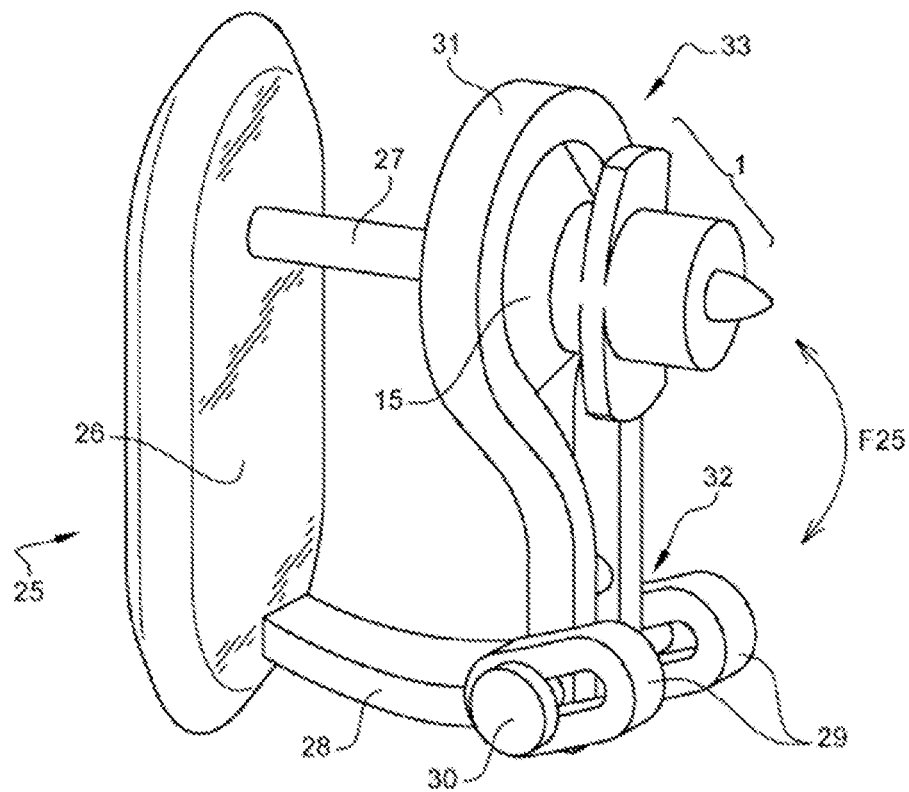
FIG. 5 is a perspective view, on a different scale, of another embodiment of the invention.

The embodiment of the invention illustrated in FIG. 5 is particularly suitable for relatively heavy and bulky earrings which are held not only on one end of a rod but also on an articulated lug or leverback supported on the back of the ear. In this way, any effort and deformation of the earlobe is avoided. Here, reference 25 designates the assembly formed by the articulated leverback provided with the holding member 1. The decorative part 26 of the assembly 25 is fixed, on the one hand, to one end of a rod 27 and, on the other, to one end of a flat lug 28. The other end of the lug 28 comprises two reliefs 29, each provided with a through hole. The reliefs 29 thus define a hinge adapted to receive a pin 30.

A structure 31 is configured in an omega or paddle shape, the central part of which is empty. Such an omega-shaped structure 31 is obtained by bending a metal wire. The free ends 32 of the omega-shaped structure 31 are each pierced with a through hole, similar to the holes in the reliefs 29. As shown in FIG. 5, when the ends 32 are positioned between the reliefs 29 and the pin 30 is in position, the omega-shaped structure 31 and the lug 28 are hinged with each other and a movement of bringing together or separating the omega-shaped structure and the rod 27 is then possible according to the double arrow F25.

The rounded part 33 of the omega-shaped structure 31 is adapted, in dimensions and in geometry, to receive the holding member 1, more precisely, the guiding means 15. Thus, the inner face of the constituent wire of the part 33 which defines the limits of the central orifice of the part 33 is beveled, so as to have a shape that is complementary to the outer wall of guiding means 15, which is funnel-shaped.

Thus, when the assembly 25 is put in position, the holding member 1 is first positioned in the part 33, then the decorative part 26 and the omega-shaped structure 31 are placed on either side of the lobe of the ear; by pivoting the lug 28 and the omega-shaped structure 31 according to the double arrow F25, the rod 27 is introduced into the guiding member 15 and, as described above, the rod 27 is secured in the guiding member 15. A relatively large and heavy earring is thus held in position without straining the earlobe and is easy to put in place.

In one embodiment, the position-holding member 1, or at least the end edge of the guiding means 15, which is in contact with the element 3 when said element is part of the body of a living being, is made of a non-allergenic material or coated with a non-allergenic material. In any case, there should be no chemical or biochemical reaction, of the corrosive or allergenic type, between the holding member 1, and in particular the guiding means 15, and the element 3.

The invention claimed is:

1. A holding member for holding an object in position on an element provided with a bore, the holding member comprising:
   a reception housing provided in a main cylindrical body of the holding member, the reception housing provided, at an opening of the reception housing, with a guiding means for a male part of the object, the male part designed as a pointed rod with a free end suitable for inserting into the reception housing; the guiding means formed of an inner conical part and an outer conical part nested coaxially one inside the other; said inner conical part has a cylinder that extends therefrom, the cylinder and said inner conical part constituting an inner part of the guiding means; and, the outer conical part extends from the main cylindrical body,
   wherein said holding member further comprises a ring and seals inserted between the cylinder and said main cylindrical body of the holding member.

2. The holding member according to claim 1, wherein the guiding means is configured as a cone of revolution.

3. The holding member according to claim 1, wherein the guiding means is configured as a cone with a pyramidal shape having a square, rectangular, or polygonal base.

4. The holding member according to claim 1, wherein the ring and the seals define the reception housing.

5. The holding member according to claim 1, wherein the main body is provided with at least two gripping members.

6. The holding member according to claim 1, wherein an inner wall of the guiding means is smooth or coated with an anti-adherent.

7. The holding member according to claim 1, wherein the object is a decorative part with the male part being a pointed rod configured to extend through an omega-shaped structure, the omega-shaped structure hingedly connected to a lug extending from the decorative part, and the holding member configured to secure the pointed rod through the omega-shaped structure when the free end of the male part of the object is inserted into the holding member.

* * * * *